United States Patent
Kondo et al.

(10) Patent No.: US 9,633,691 B2
(45) Date of Patent: Apr. 25, 2017

(54) STORAGE CONTROLLER, STORAGE DEVICE, AND METHOD

(71) Applicant: Kabushiki Kaisha Toshiba, Minato-ku, Tokyo (JP)

(72) Inventors: Yosuke Kondo, Kanagawa (JP); Kenji Yoshida, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/060,935

(22) Filed: Mar. 4, 2016

(65) Prior Publication Data

US 2017/0040035 A1    Feb. 9, 2017

Related U.S. Application Data

(60) Provisional application No. 62/202,386, filed on Aug. 7, 2015.

(51) Int. Cl.
*G11B 5/09*    (2006.01)
*G11B 20/18*    (2006.01)

(52) U.S. Cl.
CPC ............... *G11B 20/1833* (2013.01)

(58) Field of Classification Search
CPC .......... G11B 5/59655; G11B 20/10009; G11B 5/012; G11B 27/36; G11B 5/09; G11B 27/3027; G11B 2220/90
USPC .................. 360/29, 25, 31, 39, 48
See application file for complete search history.

(56) References Cited

U.S. PATENT DOCUMENTS

| | | | |
|---|---|---|---|
| 5,506,581 A * | 4/1996 | Ino ....................... | H04L 25/4915 341/58 |
| 7,002,492 B2 * | 2/2006 | Tsang ................. | G11B 20/1426 341/58 |
| 7,242,325 B2 | 7/2007 | Read | |
| 7,552,380 B2 | 6/2009 | Park et al. | |
| 8,495,461 B2 | 7/2013 | Lee | |

* cited by examiner

*Primary Examiner* — Nabil Hindi
(74) *Attorney, Agent, or Firm* — White & Case LLP

(57) ABSTRACT

A storage controller includes a control unit and an interface. The control unit, when write data input as data to be written onto a magnetic disk includes a bit string of a first pattern, inverts one or more bits of the bit string. The write data includes a redundancy bit string used for data error correction. The interface outputs write data including bit inverted by the control unit.

17 Claims, 6 Drawing Sheets

FIG.3

| PATTERN | VALUE |
|---|---|
| FIRST PATTERN | 1 |
| SECOND PATTERN | 1 |
| ⋮ | ⋮ |
| N-TH PATTERN | 0 |

FIG.4

| SELECTOR | VALUE |
|---|---|
| FIRST PATTERN NOTICE | 1 |
| SECOND PATTERN NOTICE | 1 |
| ⋮ | ⋮ |
| N-TH PATTERN NOTICE | 1 |

STORAGE CONTROLLER, STORAGE DEVICE, AND METHOD

CROSS-REFERENCE TO RELATED APPLICATIONS

This application is based upon and claims the benefit of priority from U.S. Provisional Application No. 62/202,386, filed on Aug. 7, 2015; the entire contents of which are incorporated herein by reference.

FIELD

Embodiments described herein relate generally to a storage controller, a storage device, and a method.

BACKGROUND

Conventionally, data written onto a magnetic disk sometimes includes a continuous pattern of 0 or 1, or a repetitive pattern such as 0101 . . . . In this case, it may be difficult to achieve synchronization at read or difficult to recover original write data due to deterioration of signal quality.

Accordingly, in recent years, a technique has been proposed in which for writing data onto the magnetic disk, a run length of a continuous pattern and a number of repetitive patterns (number of times of magnetization reversal) are limited by using modulation codes such as RLL codes and MTR codes.

Encoding with the modulation codes, however, may increase redundancy and deteriorate format efficiency.

BRIEF DESCRIPTION OF THE DRAWINGS

FIG. 3 is a diagram illustrating an exemplary table configuration of a processing setting storage unit according to the embodiment;

FIG. 4 is a diagram illustrating an exemplary table configuration of a notification setting storage unit according to the embodiment;

DETAILED DESCRIPTION

A storage controller according to the present embodiment includes a control unit and an interface. The control unit, when write data input as data to be written onto a magnetic disk includes a bit string of a first pattern, inverts one or more bits of the bit string. The write data includes a redundancy bit string used for error correction. The interface outputs write data including bit inverted by the control unit.

Exemplary embodiments of a storage controller, a storage device, and a method will be explained below in detail with reference to the accompanying drawings. However, the present invention should not be limited to the following embodiments.

(First Embodiment)

Figure 1:
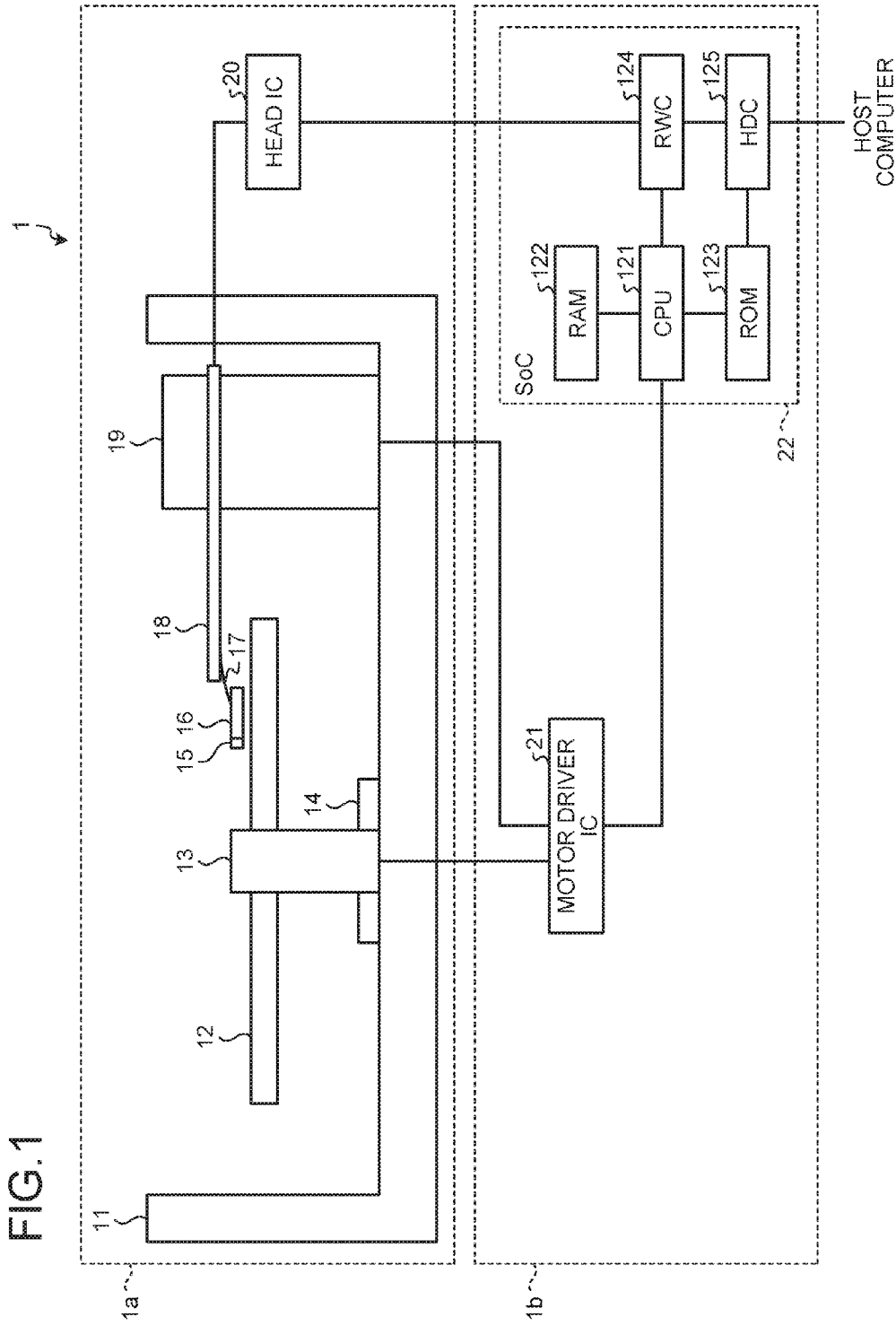
FIG. 1 is a diagram illustrating a hardware configuration of a magnetic disk device according to an embodiment.

FIG. 1 is a diagram illustrating a hardware configuration of a magnetic disk device 1 according to the present embodiment. The magnetic disk device 1 includes a disk enclosure 1a and a circuit board 1b.

The disk enclosure 1a includes a housing 11, a magnetic disk 12, a spindle 13, a spindle motor (SPM) 14, a magnetic head 15, a slider 16, a suspension 17, an actuator arm 18, a voice coil motor (VCM) 19, and a head integrated chip (IC) 20. The circuit board 1b includes a motor driver IC 21 and a system-on-a-chip (SoC) 22 as an example of a storage controller. Note that in FIG. 1 the head IC 20 is arranged outside the housing 11 for the sake of simple explanation. In practical installation, however, the head IC 20 is arranged at a predetermined position of the actuator arm 18.

The magnetic disk 12 is a disk-shaped recording media for writing various kinds of information and is configured as writeable by a perpendicular magnetic recording (PMR) method. The magnetic disk 12 has a recording layer having magnetic anisotropy in a substantially perpendicular direction with respect to a medium surface of the magnetic disk 12. A magnetic material of the magnetic recording layer is magnetized by a magnetic field applied by the magnetic head 15 in a substantially perpendicular direction with respect to the surface of the magnetic disk 12 (medium surface). The magnetic recording layer of the magnetic disk 12 is made from a material with high coercive force at normal temperature.

The magnetic disk 12 is rotatably fixed to the housing 11 via the spindle 13. The SPM 14 indirectly rotates the magnetic disk 12 by applying a rotation force to the spindle.

The magnetic head 15 is configured to read and write signals and data on the magnetic disk 12. The magnetic head 15 is provided at a longitudinal end portion of the slider 16 that is floating above the magnetic disk 12 by receiving an air flow from the rotation of the magnetic disk 12. The slider 16 is connected to the actuator arm 18 via the suspension 17 that allows the floating of the slider 16. The actuator arm 18 slides by the VCM 19 along a recording surface of the magnetic disk 12. This makes it possible for the magnetic head 15 to read and write a signal and data on any position of the magnetic disk 12.

The head IC 20 is electrically connected to the magnetic head 15 and the SoC 22. The head IC 20 amplifies the signal and data read by the magnetic head 15 from the magnetic disk 12 and outputs the signal and data to the SoC 22. The head IC 20 also outputs a current based on the signal and data output from the SoC 22, to the magnetic head 15.

The motor driver IC 21 is connected to the SPM 14, the VCM 19, and the SoC 22. The motor driver IC 21 controls the SPM 14 and the VCM 19 according to a control signal from the SoC 22, and controls positioning of the magnetic head 15 with respect to the magnetic disk 12.

The SoC 22 includes a central processing unit (CPU) 121, a random access memory (RAM) 122, a read only memory (ROM) 123, a read write channel (RWC) 124, and a hard disc controller (HDC) 125. The present embodiment describes an example of arranging the RAM 122 and the ROM 123 inside the SoC 22. Alternatively, the RAM 122 and/or the ROM 123 may be arranged outside the SoC 22.

The CPU 121 is connected with the motor driver IC 21, the RAM 122, the ROM 123, the RWC 124, and the HDC 125. The CPU 121 executes firmware for various settings and instructions such as writing and reading. The CPU 121 controls operation of each of units of the magnetic disk device 1, specifically, by sequentially reading the firmware and various types of applications from the ROM 123 for execution.

Herein, the ROM 123 is a non-volatile memory that retains data without receiving power supply. The ROM 123, for example, is a flash memory. The ROM 123 stores the firmware and the various types of applications and various data needed for execution thereof.

The RAM 122 is a main memory of the magnetic disk device 1 and provides a work area in which the CPU 121 executes the firmware and the applications.

The RWC 124 is connected to the CPU 121, the HDC 125, and the head IC 20. The RWC 124 performs predetermined signal processing on data output from the HDC 125 and outputs the data to the head IC 20. The RWC 124 outputs a test signal generated by the CPU 121 to the head IC 20. The RWC 124 generates a write gate signal and outputs the signal to the head IC 20. The RWC 124 performs predetermined signal processing on a signal and data output from the head IC 20, and outputs the signal and data to the HDC 125 and the CPU 121.

The HDC 125 is connected to the CPU 121, the RWC 124 and a host system (not illustrated). The HDC 125 forms an interface with the host system to receive data from the host system and output the data to the RWC 124, and also receives data from the RWC 124 and outputs the data to the host system.

When writing write data onto the magnetic disk 12, the magnetic disk device 1 according to the present embodiment inverts a part of bits of a continuous pattern of 0 or 1 or a repetitive pattern such as 0101 included in the write data. This enables suppression of an increase in a run-length (RUN-LENGTH) and control of the number of times of magnetization reversal.

Meanwhile, there is a conventional magnetic recording modulation encoding method including a run-length limited (RLL) coding method and a maximum transition run (MTR) encoding method for encoding data such that the number of continuous 0 is reduced to a predetermined number or below. These conventional methods however increase a redundant section of the write data, leading to deterioration of format efficiency. In view of the above, the present embodiment proposes a method for suppressing an increase of a redundant section and reducing the continuous pattern of 0 or 1 or the repetitive pattern such as 0101.

Figure 2:
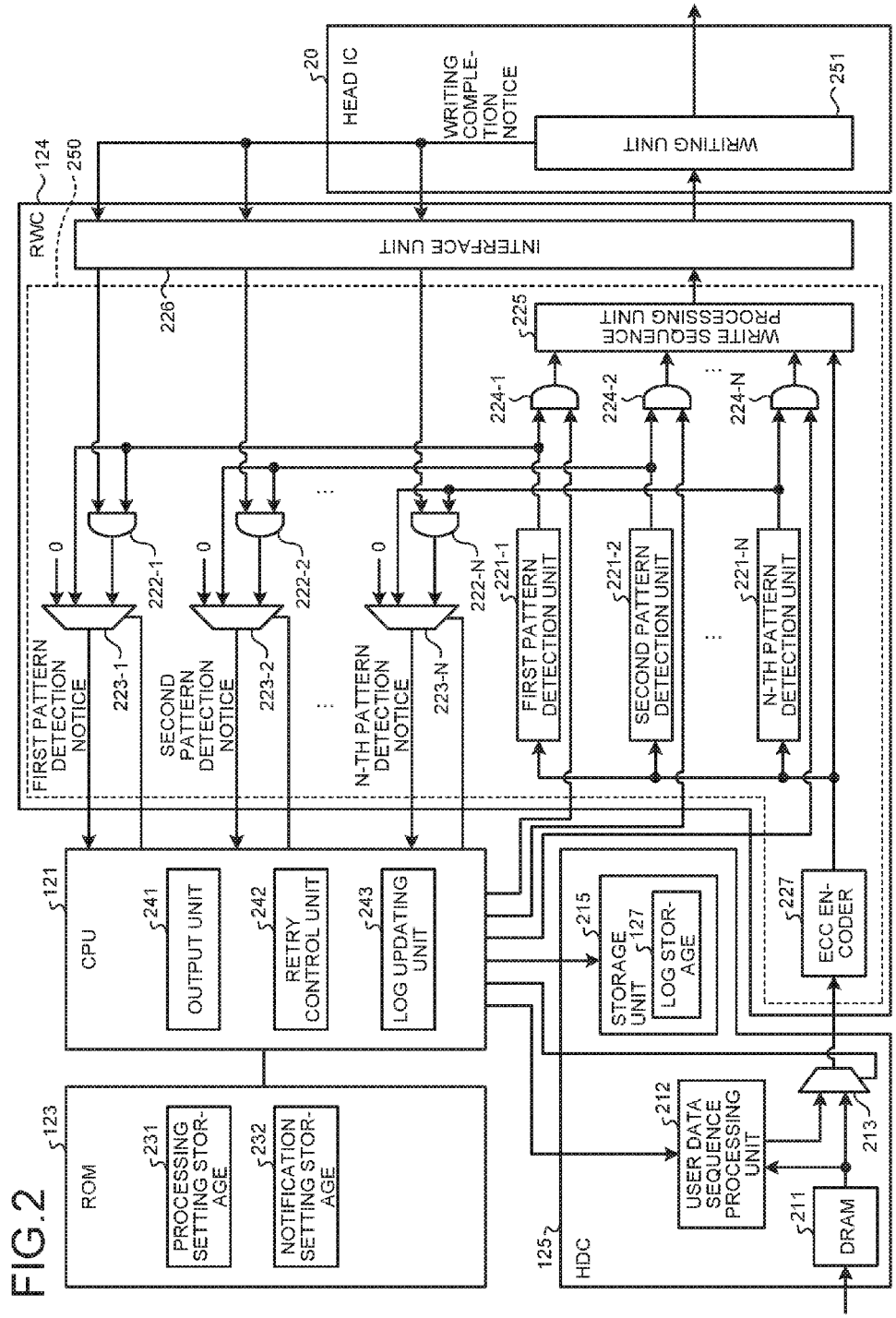
FIG. 2 is a diagram illustrating an exemplary configuration to be used for writing data in the magnetic disk device according to the embodiment.

FIG. 2 is a diagram illustrating an exemplary configuration to be used at the time of data write onto the magnetic disk device 1 according to the present embodiment. As illustrated in FIG. 2, at least the CPU 121, the ROM 123, the HDC 125, and the RWC 124 are used for writing data.

The HDC 125 includes a DRAM 211, a user data sequence processing unit 212, a data selector 213, and a storage unit 215.

The DRAM 211 temporarily stores a data sequence transmitted from the host system (hereinafter, referred to as a user data sequence). Temporarily storing the data sequence transmitted from the host system in the DRAM 211 according to the present embodiment makes it possible to achieve a write-retry onto the magnetic disk 12.

The user data sequence processing unit 212 processes the user data sequence. For retry due to an error occurring at the time of data write, for example, the user data sequence processing unit 212 reads the user data sequence from the DRAM 211 and processes the user data sequence. By the processing the error can be prevented by the write retry.

The data selector 213 selects the user data sequence to be output to an ECC encoder 227 of the RWC 124, according to an instruction from the CPU 121. The data selector 213 selects, for example, the user data sequence output from the user data sequence processing unit 212 for the write retry. In a usual case besides that, the data selector 213 selects the user data sequence read from the DRAM 211.

The storage unit 215 includes a log storage 127. The storage unit 215 according to the present embodiment may be configured of a flip-flop (F/F) or may use a readable/writable storage medium.

The log storage 127 stores a log based on a detection notification or the like according to an instruction from the CPU 121. For example, the log storage 127 stores that the pattern is detected in a write data sequence, or settings when the pattern is detected.

The RWC 124 includes a first pattern detection unit 221_1, a second pattern detection unit 221_2, ..., an N-th pattern detection unit 221_N, a first detection AND circuit 224_1, a second detection AND circuit 224_2, ..., an N-th detection AND circuit 224_N, a first notification AND circuit 222_1, a second notification AND circuit 222_2, an N-th notification AND circuit 222_N, a first pattern notification selector 223_1, a second pattern notification selector 223_2, ..., an Nth pattern notification selector 223_N, a write data sequence processing unit 225, the ECC encoder 227, and an interface unit 226. Herein, N represents a value indicating the number of patterns to be processed in the present embodiment.

In the present embodiment a control unit 250 performs various processing and includes the first pattern detection unit 221_1, the second pattern detection unit 221_2, ..., and the n-th pattern detection unit 221_N; the first detection AND circuit 224_1, the second detection AND circuit 224_2, ..., and the N-th detection AND circuit 224_N; the first notification AND circuit 222_1, the second notification AND circuit 222_2, ..., and the N-th notification AND circuit 222_N; the first pattern notification selector 223_1, the second pattern notification selector 223_2, ..., and the N-th pattern notification selector 223_N; the write data sequence processing unit 225; and the ECC encoder 227. The present embodiment further includes the interface unit 226 for outputting information generated by the control unit 250 and for inputting information into the control unit 250.

The ECC encoder 227 converts the user data sequence into a code word used for error detection at the time of data read. The present embodiment uses a low-density parity-check code as an exemplary error correction code. Alternatively, another technique may be used therefor. In the present embodiment, the data sequence output from the ECC encoder 227 is referred to as write data sequence.

Typical error detection and correction adds a m-bit redundancy bit string to a codeword with a k unit length (k bit) and converts it into a codeword with k+m unit length. Use of this redundancy enables error correction.

Since the write data sequence according to the present embodiment also has a redundant section by conversion to the codeword by the ECC encoder 227, it can be subjected to the error detection and correction.

The first pattern detection unit 221_1, the second pattern detection unit 221_2, ..., and the N-th pattern detection unit 221_N detect whether the write data sequence includes a predetermined bit string pattern for each of the detection units.

For example, the first pattern detection unit 221_1 detects a continuous pattern of '0' as the predetermined bit string. For another example, the second pattern detection unit 221_2 detects a continuous pattern of '1' as the predetermined bit string. For another example, the N-th pattern detection unit 221_N detects the repetitive pattern such as 0101 . . . as the predetermined bit string. In this manner, a bit string as a subject of detection is preset for each of the pattern detection units in the present embodiment.

For example, the first pattern detection unit 221_1 and the second pattern detection unit 221_2 detect whether every 16-bit shows a continuous pattern. For another example, the N-th pattern detection unit 221_N detects whether every 10-bit shows a repetitive pattern. In this manner, each of the pattern detection units performs detection for every bit string according to a pattern to be detected.

The first pattern detection unit 221_1 subsequently outputs a first pattern detection signal that indicates a detection result. For example, the first pattern detection unit 221_1 outputs the first pattern detection signal '1' upon determining that the write data sequence includes a continuous pattern. The first pattern detection unit 221_1 outputs the first pattern detection signal '0' upon determining that the write data sequence does not include a continuous pattern. The first pattern detection signal is output to the first notification AND circuit 222_1 and the first detection AND circuit 224_1.

Similarly, the second pattern detection unit 221_2 outputs a second pattern detection signal indicating '0' or '1' as a continuous pattern detection result. The second pattern detection signal is output to the second notification AND circuit 222_2 and the second detection AND circuit 224_2.

The nth pattern detection unit 221_N also outputs an N-th pattern detection signal indicating '0' or '1' as a repetitive pattern detection result. The N-th pattern detection signal is output to the N-th notification AND circuit 222_N and the N-th detection 224_N AND circuit. Herein, description of the other pattern detection units will be omitted since they perform similar processing.

Herein, the first detection AND circuit 224_1 performs an AND operation on the first pattern detection signal and a first pattern processing enable signal. Herein, the first pattern processing enable signal is a signal output from the CPU 121 and indicates whether the bit string of the pattern detected by the first pattern detection unit 221_1 is to be processed. The first pattern processing enable signal is set to '1' when the bit string is to be processed; the signal is set to '0' when the bit string is not to be processed. The present embodiment describes an example in which a pattern processing enable signal (the first pattern processing enable signal, for example) is directly output from the CPU 121. It should not be, however, limited to the direct output from the CPU 121. For example, the signal may be output via a register (not illustrated) inside the RWC 124.

The first detection AND circuit 224_1 outputs a first processing instruction signal that includes '1' to indicate execution of the processing when the first pattern detection signal and the first pattern processing enable signal both indicate '1'. The first detection AND circuit 224_1 outputs a first processing instruction signal that includes '0' to indicate non-execution of the processing when the combination of the first pattern detection signal and the first pattern processing enable signal indicates other than both "1".

Herein, description of the second detection AND circuit 224_2, . . . , and the N-th detection AND circuit 224_N will be omitted since they perform similar processing as the first detection AND circuit 224_1. The second detection AND circuit 224_2 outputs a second processing instruction signal. The N-th detection AND circuit 224_N outputs an N-th processing instruction signal.

The write data sequence processing unit 225 processes the bit string included in the write data sequence input from the ECC encoder 227 according to the processing instruction signals from the first detection AND circuit 224_1 to the N-th detection AND circuit 224_N.

When recognizing that the write data sequence includes a bit string with a predetermined pattern, the write data sequence processing unit 225 according to the present embodiment inverts any one bit of the bit string according to the processing instruction signal. The position of the bit to be inverted may differ for each detected pattern. The write data sequence processing unit 225 outputs the write data that includes the inverted bit to the head IC 20. The number of bits to be inverted is one in the present embodiment. Alternatively, a plurality of bits may be inverted.

For example, when receiving the first processing instruction signal '1', the write data sequence processing unit 225 inverts any one of the bit string with a continuous '0' pattern (detected by the first pattern detection unit 221_1) included in the write data sequence to '1'. In the present embodiment, the position of the bit to be inverted among the bit string (16 bit) is preset.

By the processing performed by the write sequence processing unit 225, a bit of the bit string with a continuous pattern of '0' or '1' or a repetitive pattern such as 0101 . . . is inverted. This can reduce occurrence of the continuous pattern and the repetitive pattern in the write data sequence.

Conventionally, when reading data from the magnetic disk and write data includes a continuous pattern of 0 or 1 or a repetitive pattern such as 0101 . . . , it is difficult to recover original write data due to difficulty in synchronization at read or due to deterioration in signal quality. To avoid this, the run length of the continuous pattern and the number of the repetitive patterns (number of times of magnetization reversal) are restricted at the time of data writing on the magnetic disk by using modulation codes such as RLL code and MTR code. The encoding with the modulation codes, however, may increase a redundant section and deteriorate format efficiency. This is the reason why according to the present embodiment, a bit of write data sequence including a continuous pattern or a repetitive pattern is inverted.

A bit inversion on the write data sequence means inclusion of a bit error. The write data sequence according to the present embodiment, however, includes redundancy (redundant section) for implementing error detection and correction. It is possible, therefore, to detect and correct an error at the time of data read.

The interface unit 226 transmits/receives information to/from the head IC 20. For example, the interface unit 226 outputs the write data sequence processed (namely, bit inverted) by the write sequence processing unit 225 to a writing unit 251 of the head IC 20.

In the present embodiment other processings than the bit inversion may be performed. For example, when each of the pattern detection units (first pattern detection unit 221_1, second pattern detection unit 221_2, . . . , n-th pattern detection unit 221_N) has detected one or more of either continuous or repetitive patterns and then has notified the pattern to the CPU 121, the CPU 121 may stop a write operation.

The following processing depends on the magnetic disk device 1. For example, in a case where the repetitive pattern is detected from a redundant section of the ECC code and the user data sequence includes an arbitrarily rewritable bit area, the user data sequence processing unit 212 writes an arbitrary value into the bit area. Performing ECC encoding again by using the written user data sequence can prevent the inclusion of the repetitive pattern in the write data sequence.

The head IC 20 includes the writing unit 251. The writing unit 251 controls writing of input write data sequence onto the magnetic disk 12. After the write control, the writing unit 251 outputs a writing completion notice to each of the notification AND circuits (first notification AND circuit 222_1, second notification AND circuit 222_2, . . . , and N-th notification AND circuit 222_N).

Herein, the first notification AND circuit 222_1 performs an AND operation on the writing completion notice and the first pattern detection signal. Herein, the writing completion notice is a signal output from the writing unit 251 via the interface unit 226. The writing completion notice indicates whether the write data sequence has been correctly written onto the magnetic disk 12. The writing completion notice is set to '1' when the writing has been performed correctly and set to '0' when an error has occurred during the writing.

Subsequently, the first notification AND circuit 222_1 outputs the writing completion notice '1' when the first pattern detection signal and the writing completion notice both indicate '1'. The writing completion notice '1' indicates that the write data sequence related to the detected continuous pattern has been written.

Herein, description of the second notification AND circuit 222_2, . . . , and the N-th notification AND circuit 222_N will be omitted, since they perform similar processing as the first notification AND circuit 222_1.

The first pattern notification selector 223_1 selects any one of the signal '0', the first pattern detection signal, and the writing completion notice according to an instruction from the CPU 121. Subsequent the first pattern notification selector 223_1 outputs the selected signal or notice as a first pattern detection notice.

The selection of the signal '0' indicates that the CPU 121 does not need information on the first pattern selection unit 221_1. The selection of the first pattern detection signal indicates that the CPU 121 receives a notice if the first pattern detection unit 221_1 has detected a pattern. The selection of the writing completion notice indicates that the CPU 121 receives a writing completion notice of the write data sequence related to the pattern detected by the first pattern detection unit 221_1.

Herein, description of the second pattern notification selector 223_2, . . . , and the Nth pattern notification selector 223_N will be omitted since they perform similar processing as the first pattern notification selector 223_1. The present embodiment has described an example in which the first pattern notification selector 223_1 to the N-th pattern notification selector 223_N perform selection according to the instruction from the CPU 121. Note that the operations of the first pattern notification selector 223_1 to the N-th pattern notification selector 223_N are not limited to ones according to the direct instruction from the CPU 121. For example, they may be instructed through a register (not illustrated) inside the RWC 124.

The ROM 123 stores various kinds of data to be used for the processing by the CPU 121 in a processing setting storage 231 and a notification setting storage 232.

The processing setting storage 231 stores setting information indicating necessity or not of processing for each of patterns. FIG. 3 is a diagram illustrating an exemplary table configuration of the processing setting storage 231 according to the present embodiment. Herein, setting information stored in the processing setting storage 231 represents the setting of a pattern enable signal to be output to the detection AND circuit. The processing setting storage 231 stores a "pattern" and a "value" in association with each other, as FIG. 3.

The pattern retains information on an output destination of the pattern enable signal. For example, a "first pattern" indicates that the output destination is the first detection AND circuit 224_1.

The value is set to either '1' or '0'. According to the present embodiment, when the value is '1', the CPU 121 outputs a signal that indicates execution of processing. When the value is '0', the CPU 121 outputs a signal that indicates non-execution of processing.

The notification setting storage 232 stores setting information indicating whether or not the CPU 121 is notified every time the pattern is detected. FIG. 4 is a diagram illustrating an exemplary table configuration of the notification setting storage 232 according to the present embodiment. The notification setting storage 232 stores a "selector" and a "value" in association with each other, as FIG. 4.

The "selector" indicates a selector to be set. Herein, when the selector is set to "first pattern notice", the first pattern notice selector 223_1 is determined as a selector to be set to issue a notice when the first pattern has been detected.

Herein, the value is set to '0', '1', or '2' According to the present embodiment, if the value is '0', a signal '0' is set in the selector as a notice to the CPU 121s. If the value is '1', a pattern detection notice (notifying that the pattern has been detected) is set in the selector as a notice to the CPU 121 is. If the value is '2', a writing completion notice is set in the selector as a notice to the CPU 121.

For example, when the selector is "first pattern notice" and the value is '1', the CPU 121 issues an instruction to the first pattern notice selector 223_1 to output the pattern detection notice.

The CPU 121 implements an output unit 241, a retry control unit 242 and a log updating unit 243 by a program stored in the ROM 123.

The output unit 241 outputs the pattern processing enable signal indicating execution or not of processing by each of the detection AND circuits (first detection AND circuit 224_1, second detection AND circuit 224_2, and N-th detection AND circuit 224_N) based on the processing setting storage 231. This can set execution or not of processing for each of the patterns.

The output unit 241 outputs a signal indicating a type of information to be notified to the CPU 121 to each of the pattern notice selectors (first pattern notice selector 223_1, second pattern notice selector 223_2, and N-th pattern notice selector 223_N), based on the notification setting storage 232. This can set information to be notified for each of the patterns.

The retry control unit 242 controls write retry. The retry control unit 242 according to the present embodiment performs retry control based on the pattern detection notice from the pattern notification selectors (first pattern notification selector 223_1, second pattern notification selector 223_2, and Nth pattern notification selector 223_N).

For example, the retry control unit 242 according to the present embodiment performs the retry control in a case where the pattern detection notice indicates the detection of the bit string with the predetermined pattern from the write data sequence but no setting for the pattern processing has been made. More specifically, the retry control unit 242 performs the retry control when it receives an Nth pattern detection notice '1' from the Nth pattern notice selector 223_N and the value associated with the N-th pattern in the processing setting storage 231 is '0' (non-execution of processing).

The retry control unit 242 according to the present embodiment instructs the user data sequence processing unit 212 to process the data. The retry control unit 242 further instructs the data selector 213 to select the user data sequence output from the user data sequence processing unit 212.

The user data sequence processing unit 212 processes the user data sequence read from the DRAM 211 according to the instruction. Herein, the processing includes the inversion of any bit of an arbitrarily rewritable bit area (header, for example) of the user data sequence. Thus, by inversion of a bit in the user data sequence, it is made possible to prevent the write data sequence converted by the ECC encoder 227 match the continuous pattern and the repetitive pattern.

The log updating unit 243 updates the log stored in the log storage 127 according to the notice the CPU 121 has received. This enables processed write data sequence to be specified from the write data sequence written onto the magnetic disk 12.

Figure 5:
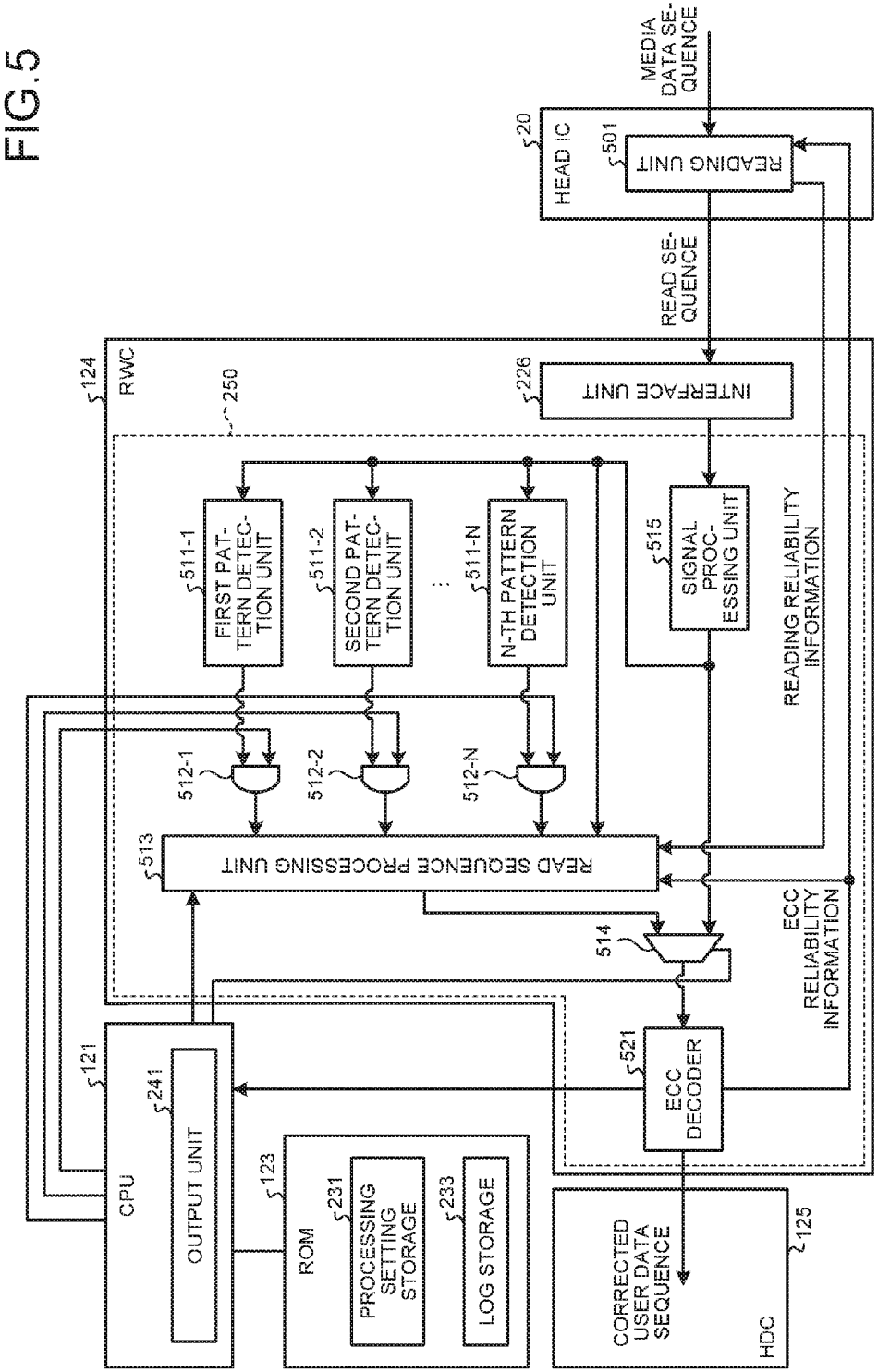
FIG. 5 is a diagram illustrating an exemplary configuration to be used for reading in the magnetic disk device in the embodiment.

FIG. 5 is a diagram illustrating an exemplary configuration of the magnetic disk device 1 to be used for data read in the present embodiment. As illustrated in FIG. 5, at least the CPU 121, the ROM 123, the HDC 125, and the RWC 124 are used for data read.

The head IC 20 includes a reading unit 501. The reading unit 501, according to a read instruction, reads a media data sequence from the magnetic disk 12 and outputs the data sequence to the signal processing unit 515 inside the RWC 124.

The RWC 124 includes a first pattern detection unit 511_1, a second pattern detection unit 511_2, N-oh pattern detection unit 511_N, a first detection AND circuit 512_1, a second detection AND circuit 512_2, . . . , an N-th detection AND circuit 512_N, a read sequence processing unit 513, a data selector 514, a signal processing unit 515, and an ECC decoder 521.

The signal processing unit 515 receives the media data sequence from the reading unit 501, performs waveform processing thereon and outputs the waveform-processed data sequence as a read data sequence. The waveform processing includes A/D conversion, equalization, and Viterbi decoder. Thereafter, an error is corrected by the ECC decoder 521. In the error correction, the bit section inverted at the time of writing is corrected to the one before the bit inversion.

The data selector 514, according to the instruction from the CPU 121, selects a read data sequence to be output to the ECC decoder 521.

For example, the data selector 514, according to the instruction from the CPU 121, selects the read data sequence output from the reading unit 501.

When the ECC decoder 521 has failed in decoding, the data selector 514, according to the instruction from the CPU 121 selects the read data sequence output from the read sequence processing unit 513.

In this manner, the data selector 514 according to the present embodiment normally selects the read data sequence output from the signal processing unit 515 and can select processed read data sequence in the case of a decoding failure. The present embodiment should not be limited to such a selecting method. For example, another method for normally selecting the processed read data sequence can be used. Description has been given on an example in which the data selector 514 selects a read data sequence according to the instruction from the CPU 121. Alternatively, the data selector 514 can be given an instruction via a register (not illustrated) inside the RWC 124 instead of the direct instruction from the CPU 121.

The ECC decoder 521 performs an error correction on the input read data sequence and outputs the user data sequence as a result of the error correction to the HDC 125. The present embodiment uses a low-density parity-check code as an error correction code. Alternatively, another code can be used. In the present embodiment the ECC decoder 521 is provided inside the RWC 124. However, it may be provided inside the HDC.

The ECC decoder 521 detects and corrects an error in the read data sequence output from the signal processing unit 515 by ECC decoding, and then outputs the corrected user data sequence to the host system. The ECC decoder 521 does not have positional information on the bit inverted by the write sequence processing unit 225. The ECC decoder 521, however, has an error correcting capacity sufficient to correct the inverted bit. Thus, the ECC decoder 521 can correct the inverted bit at data write and a bit error due to a noise or the like at an actual data read.

Having failed in error correction, the ECC decoder 521 according to the present embodiment outputs the failure to the CPU 121. The CPU 121 then instructs the data selector 514 to select the read data sequence output from the read sequence processing unit 513.

That is, the number of errors included in the read data sequence can be decreased by correcting the bit inversion at the data write with the configuration illustrated in FIG. 2. This can improve error correctability using the redundancy of the read data sequence. In other words, though the error correction has failed, there is a potential for success in error correction after correcting the inverted bit at the data write. Accordingly, in the present embodiment the read sequence processing unit 513 is configured to be able to correct the error in accordance with the detected pattern when the error correction has failed.

In view of this, when the ECC decoder 521 has failed in the error correction of the read data sequence, the same read data sequence is read again. In addition, the ECC decoder 521 outputs ECC reliability information to the read sequence processing unit 513 and the signal processing unit 515.

The signal processing unit 515 corrects media data sequence based on the ECC reliability information, and outputs the corrected media data sequence as the read data sequence. In addition, the signal processing unit 515 outputs the reading reliability information to the read sequence processing unit 513.

The read data sequence is also output to the read sequence processing unit 513, the first pattern detection unit 511_1, the second pattern detection unit 511_2, . . . , and the N-th pattern detection unit 511_N.

The first pattern detection unit 511_1, the second pattern detection unit 511_2, . . . , and the N-th pattern detection unit 511_N detect whether the read data sequence includes the pattern containing a particular bit string preset for each of the pattern detection units. That is, the pattern detection units (first pattern detection unit 511_1, second pattern detection unit 511_2, and N-th pattern detection unit 511_N) detect, from the read data sequence, a particular bit string including an inverted predetermined bit among the bit string of the pattern detected based on the write data sequence at the time of data write onto the magnetic dish 12.

For example, the first pattern detection unit 511_1 detects, as the particular bit string, a bit string including a bit '1' only at a predetermined position from among the bit string having the continuous pattern of '0'. Herein, the predetermined position is set to a position of the bit inverted by the write sequence processing unit 225.

The first pattern detection unit 511_1 outputs the first pattern detection signal that indicates the detection result. For example, the first pattern detection unit 511_1 outputs the first pattern detection signal '1' upon determining that the above-described pattern is included. The first pattern detection unit 511_1 outputs the first pattern detection signal '0' upon determining that the above-described pattern is not included.

For another example, the second pattern detection unit 511_2 detects, as the particular bit string, the bit string including a bit '0' only at a predetermined position from among the bit string with the continuous pattern of '1'. For another example, the N-th pattern detection unit 221_N detects, as the particular bit string, the bit string including an inverted bit at a predetermined position from among the repetitive pattern such as 0101 . . . . In this manner, each of the pattern detection units detects the bit string processed by the write sequence processing unit 225 at the time of data write.

Similarly to the first pattern detection unit 511_1, the other pattern detection units each output the pattern detection signal that indicates the detection result.

Herein, the first detection AND circuit 512_1 performs an AND operation on the first pattern detection signal and a first pattern processing enable signal. Herein, the first pattern processing enable signal is the same as the first pattern processing enable signal output from the output unit 241 in FIG. 2. That is, the first pattern processing enable signal in FIG. 5 indicates whether the pattern has been processed or not processed at the time of data write. The present embodiment describes an example in which a pattern processing enable signal (first pattern to N-th pattern processing enable signals, for example) is directly output from the CPU 121. The present embodiment should not be, however, limited thereto. For example, the signal may be output via a register (not illustrated) inside the RWC 124.

The first detection AND circuit 512_1 outputs a first processing instruction signal including '1' to indicate execution of the processing when the first pattern detection signal and the first pattern processing enable signal both indicate '1'. The first detection AND circuit 512_1 outputs a first processing instruction signal including '0' to indicate non-execution of the processing when the combination of the first pattern detection signal and the first pattern processing enable signal indicates other than both '1'.

Herein, description of the second detection AND circuit 512_2, . . . , and the N-th detection AND circuit 512_N will be omitted since they perform similar processing as the first detection AND circuit 512_1. The second detection AND circuit 512_2 outputs a second processing instruction signal. The N-th detection AND circuit 512_N outputs an N-th processing instruction signal.

The read sequence processing unit 513 processes a bit string of the read data sequence input from the signal processing unit 515 according to processing instruction signal of the first detection AND circuit 224_1 to the N-th detection AND circuit 224_N. In the present embodiment, processing to be executed is preset for each of the detected patterns.

Specifically, upon receiving the first processing instruction signal '1', the write sequence processing unit 225 inverts an inverted bit '1' of the bit string having the continuous pattern of '0', that is, the bit '1' at the predetermined position, to '0' from bit strings of the read data sequence.

The bit inverted at the time of data write can be corrected by the processing by the write sequence processing unit 225. The write sequence processing unit 225 subsequently outputs, as the read data sequence, the bit string with the continuous pattern of '0' or '1' or the bit string with the repetitive pattern such as 0101 . . . .

The write sequence processing unit 225 may alternatively use a log stored in the log storage 127, the ECC reliability information, and the reading reliability information when determining a bit to be inverted. Thereby, the write sequence processing unit 225 can improve bit inversion accuracy.

The processed read data sequence is output from the write sequence processing unit 225 to the ECC decoder 521. Having succeeded in error correction, the ECC decoder 521 outputs the corrected user data sequence to the host system.

Figure 6:
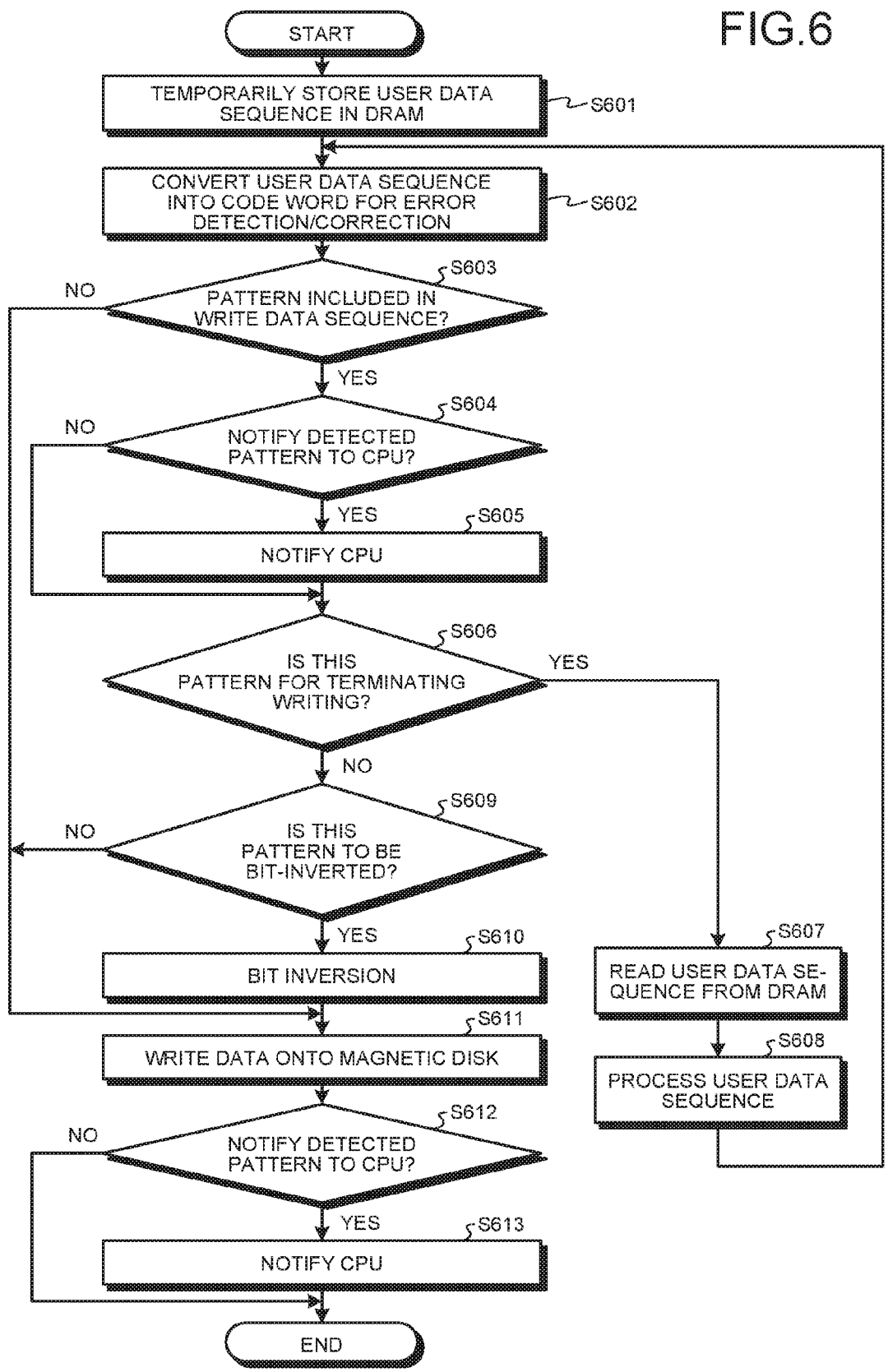
FIG. 6 is a flowchart illustrating a procedure for writing processing in the magnetic disk device according to the embodiment.

Next, write processing on the magnetic disk device 1 will be described according to the present embodiment. FIG. 6 is a flowchart illustrating steps of the above-described processing on the magnetic disk device 1 according to the present embodiment.

The HDC 125 temporarily stores in the DRAM 211 the user data sequence input from the host system (S601). Herein, the data selector 213 has selected the DRAM 211.

The ECC encoder 227 reads the user data sequence from the DRAM 211 and converts the user data sequence into a code word for the error detection and correction (S602). The converted code word is referred to as write data sequence.

Each of the pattern detection units detects whether or not the write data sequence contains a bit string with a predetermined pattern (S603). When all of the pattern detection units determine that the write data sequence does not contain the bit string with the predetermined pattern (S603: No), the flow proceeds to S611.

Meanwhile, when each of the pattern detection units (first pattern detection unit 221_1, second pattern detection unit 221_2, and n-th pattern detection unit 221_N) determines that the write data sequence contains the bit string with the predetermined pattern(S603: Yes), the notification AND circuit and the pattern notification selector determine whether the detected pattern should be notified to the CPU 121 (S604). When determining that notification should not be issued, (S604: No), the flow proceeds to S606. When determining that notification should be issued (S604: Yes), the notification AND circuit and the pattern notification selector transmit the pattern detection signal to the CPU 121 (S605).

The CPU 121 determines whether or not the pattern is the one for terminating data write in accordance with the transmitted pattern detection signal (S606). When determining that the pattern is the one for terminating data write (S606: Yes), the CPU 121 terminates writing the write data sequence Subsequently, the user data sequence processing unit 212 reads the user data sequence from the DRAM 211 (S607) according to the instruction of the CPU 121 and processes the user data (S608). Thereafter, the flow returns to S602.

When determining that the pattern is not the one for terminating data write from the notified pattern detection signal (S606: No), the CPU 121 performs processing including storing the transmitted pattern detection signal in the log storage 127 as a log, when needed.

The notification AND circuits (the first notification AND circuit 222_1, the second notification AND circuit 222_2, . . . , the Nth notification AND circuit 222_N) each output a pattern processing enable signal on the basis of presence/absence of processing for each of the patterns and the pattern detection signal sent from the CPU 121.

The write sequence processing unit 225 receives the user data sequence from the ECC encoder 227 and determines whether the user data sequence includes the pattern including a bit to be inverted (S609) from the pattern processing enable signal. According to the present embodiment, it determines to perform bit-inversion when one or more of the first pattern processing enable signal, the second pattern processing enable signal, and the N-th pattern processing enable signal indicates '1'.

When the write sequence processing unit 225 determines that the user data sequence includes no concerning pattern (S609: No), the flow proceeds to S611. On the other hand, when the write sequence processing unit 225 determines that no concerning pattern is included in the data (S609: Yes), the bit is inverted (S610). Herein, the position of the bit to be inverted may change according to the detected pattern.

The writing unit 251 writes the write data sequence output from the write sequence processing unit 225 onto the magnetic disk 12 (S611). The writing unit 251 has written the write data sequence and outputs the writing completion notice.

Subsequently, the pattern notification selector determines whether to issue the writing completion notice to the CPU (612). If it determines to issue the notice (S612: No), the flow ends. On the other hand, if determining to issue the notice (S612: Yes), the pattern notification selector issues the writing completion notice to the CPU 121 (S613).

According to the present embodiment, by the above-described processing, it is made possible to write, onto the magnetic disk 12, the write data sequence having the continuous pattern of '0' or '1' or the repetitive pattern such as "010101" corrected.

Figure 7:
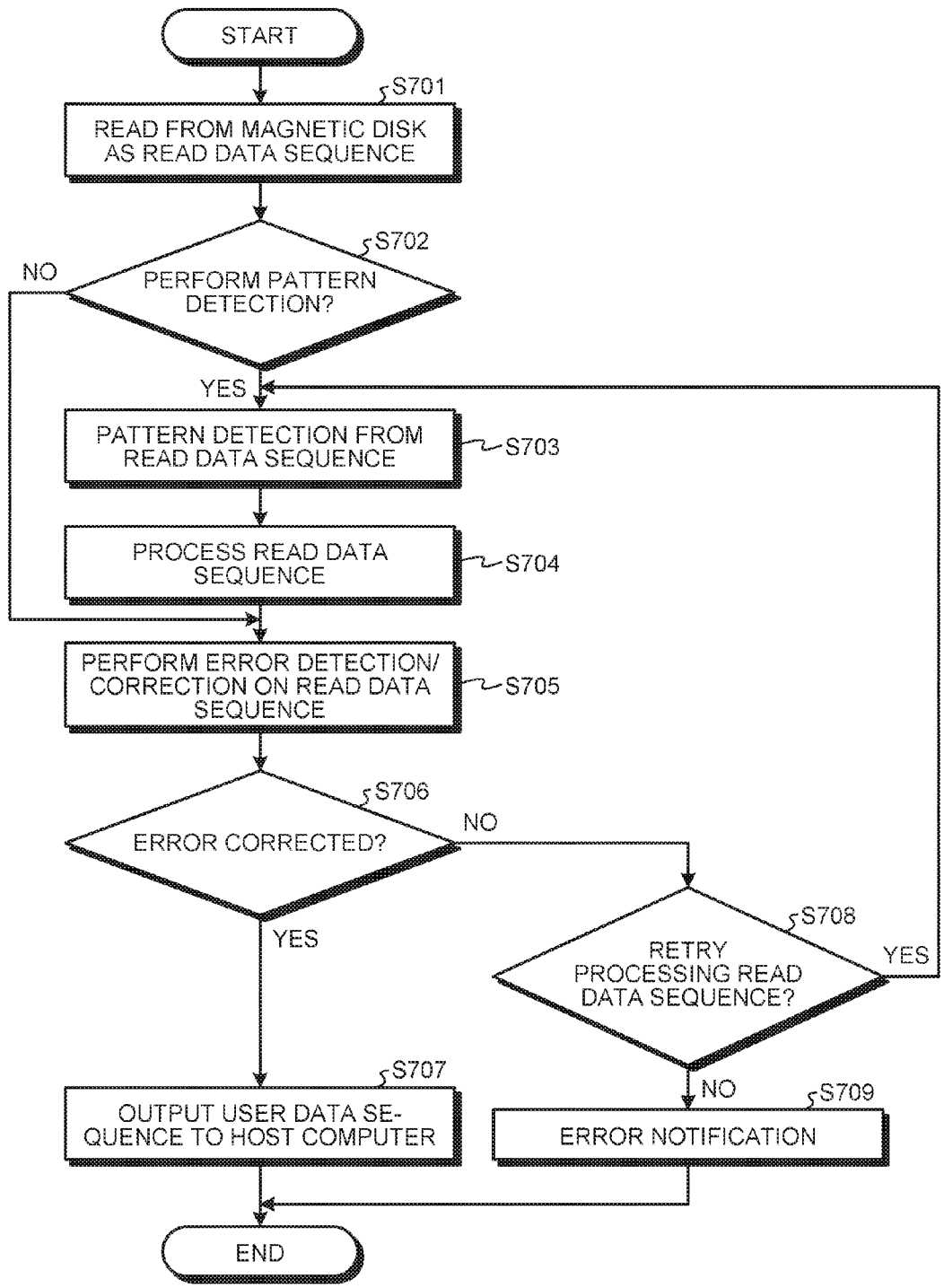
FIG. 7 is a flowchart illustrating a procedure for reading processing in the magnetic disk device according to the embodiment.

Next, read processing on the magnetic disk device 1 according to the present embodiment will be described. FIG. 7 is a flowchart illustrating steps of the above-described processing on the magnetic disk device 1 according to the present embodiment.

The reading unit 501 outputs the media data sequence from the magnetic disk 12 as the read data sequence (S701). The CPU 121 determines whether or not detect the patterns from the read data sequence (S702). The CPU 121 sets the selector 514 based on a result of the determination.

When the CPU 121 determines not to perform pattern detection (S702: No), the ECC decoder 521 performs error detection and correction (S705) on the read data sequence input via the data selector 514.

On the other hand, when the CPU 121 determines to perform pattern detection (S702: Yes), each of the pattern detection units detects whether the read data sequence includes a bit string with a predetermined pattern (S703).

Each of the pattern detection units outputs a pattern detection signal indicating inclusion or non-inclusion of the pattern in the bit string. The detection AND circuit performs an AND operation on the pattern detection signal and the pattern processing enable signal output from the CPU 121. The detection AND circuit notifies a result of the AND operation to the read sequence processing unit 513.

The read sequence processing unit 513 processes the read data sequence according to the notice from the detection AND circuit (S704). When the data selector 514 has selected the read data sequence from the read sequence processing unit 513, the ECC decoder 521 performs error detection and correction on the read data sequence output from the read sequence processing unit 513 (S705).

The ECC decoder 521 determines whether the error has been corrected (S706). When determining that the error has been corrected (S706: Yes), the ECC decoder 521 outputs the data sequence to the host system as the user data sequence (S707).

On the other hand, when determining that the error has not been corrected (S706: No), the ECC decoder 521 notifies the determination to the CPU 121. Subsequently, the CPU 121 determines whether to retry the processing on the read data sequence (S708). When determining not to retry the processing (S708: No), the CPU 121 outputs an error notice to the host system(S709), and ends the processing.

The CPU 121, when determining to retry the processing of the read data sequence (S708: Yes), detects whether the read data sequence output from the signal processing unit 515 includes a bit string with a predetermined pattern (S703)and proceeds to S704 and subsequent steps.

In the above-described embodiment, the pattern detection units are provided for detecting whether the write data sequence after the ECC encoding includes the bit string with the predetermined pattern, in order to restrict a run-length and the number of times of magnetization reversal. The pattern detection unit is provided to detect whether the run-length and the number of times of continuous magnetization reversal of the bit string with the predetermined pattern are a predetermined length and value or less. If the length of the bit string is greater than the predetermined length, one bit of the bit string is inverted. This makes it possible to restrict the run-length and the number of times of continuous magnetization reversal to the predetermined level or less. Accordingly, this can prevent an error at the time of data read.

In the above-described embodiment, it is possible to reduce the use of a run-length limited (RLL) coding and a maximum transition run (MTR) encoding by inverting a bit of a bit string, achieving suppression of redundancy of the write data sequence. This enables suppression of deterioration of format efficiency.

In the present embodiment, it is possible to execute different types of processing according to the pattern. This enables implementation of processing and log recording or the like according to the importance of the pattern. It is possible to execute a plural of processing (for example inverting one or more bits of bit string included in a read user data, inverting one or more bits of the bit string after encoding, and notification) according to the pattern.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage controller comprising:
   a control unit that, in a case where write data include a bit string of a first pattern, inverts one or more bit values of the bit string, the write data having been input as data to be written onto a magnetic disk, the write data including a redundancy code that is used for data error correction; and that, in a case where the write data further include a bit string of a second pattern different from the first pattern, reads first user data from a storage unit, inverts one or more bit values of bit string included in the read first user data, and encodes the first user data of which the one or more bit values is inverted to generate the write data, the first user data corresponding to the second pattern and write data before encoded; and an interface that outputs the write data including the bit value inverted by the control unit.

2. The storage controller of claim 1, wherein, in a case where the write data include the bit string of the first pattern or the bit string of the second pattern, the control unit notifies that the first pattern or the second pattern have been detected according to information stored in the storage unit, the information indicating whether detection of the first pattern or the second pattern is to be notified.

3. The storage controller of claim 1, wherein, in a case where the write data include a bit string of Nth pattern different from the first pattern and from the second pattern, the control unit inverts one or more bit values of the bit string included in second user data read from the storage unit, and notifies that the Nth pattern has been detected, where N is integer, the second user data corresponding to the Nth pattern and write data before encoded.

4. The storage controller of claim 1, wherein, in a case where error detection and correction of read data read from the magnetic disk is failed and a bit string included in the read data is a pattern that is modified based on the first pattern, the control unit inverts one or more bit values of the bit string and performs an error correction again on the read data that include the bit string of which the one or more bit values is inverted.

5. The storage controller of claim 1, wherein the control unit, in a case where a bit string of read data read from the magnetic disk includes a pattern that is modified based on the second pattern after error detection and correction is performed, inverts one or more bit values of the bit string.

6. The storage controller of claim 3, wherein, in a case where error detection and correction of read data read from the magnetic disk is failed and a bit string included in the read data before or after the error detection and correction is a pattern that is modified based on the Nth pattern, the control unit inverts one or more bit values of the bit string and performs an error correction again, or inverts one or more bit values.

7. A storage device comprising:
a magnetic disk;
a controller that, in a case where write data include a bit string of a first pattern, inverts one or more bit values of the bit string, the write data having been input as data to be written onto the magnetic disk, the write data including a redundancy code that is used for data error correction;
a writing unit that writes write data having inverted bit value onto the magnetic disk; and
a storage unit that stores first user data corresponding to a second pattern different from the first pattern and write data before encoded,
wherein, in a case where the write data further include a bit string of the second pattern, the controller reads the first user data from the storage unit, inverts one or more bit values of bit string included in the read first user data, and encodes the first user data of which the one or more bit values is inverted to generate the write data.

8. The storage device of claim 7,
wherein the storage unit stores information indicating whether detection of the first pattern or the second pattern is to be notified, and the controller, in a case where the write data include the bit string of the first pattern or the bit string of the second pattern, notifies that the first pattern or the second pattern have been detected according to the information stored in the storage unit.

9. The storage device of claim 7, wherein, in a case where the write data include a bit string of Nth pattern different from the first pattern and from the second pattern, the controller inverts one or more bit values of the bit string included in second user data read from the storage unit, and notifies that the Nth pattern has been detected, where N is integer, the second user data corresponding to the Nth pattern and write data before encoded.

10. The storage device of claim 7, wherein, in a case where error detection and correction of read data read from the magnetic disk is failed and a bit string included in the read data is a pattern that is modified based on the first pattern, the controller inverts one or more bit values of the bit string and performs an error correction again on the read data that includes the bit string of which the one or more bit values is inverted.

11. The storage device of claim 7, wherein the controller, in a case where a bit string of read data read from the magnetic disk includes a pattern that is modified based on the second pattern after error detection and correction is performed, inverts one or more bit values of the bit string.

12. The storage device of claim 9, wherein, in a case where error detection and correction of read data read from the magnetic disk is failed and a bit string included in the read data before or after the error detection and correction is a pattern that is modified based on the Nth pattern, the controller inverts one or more bit values of the bit string and performs an error correction again, or inverts one or more bit values.

13. A method of a storage device that includes a magnetic disk and a storage unit, the method comprising:
in a case where write data include a bit string of a first pattern, inverting one or more bit values of the bit string, the write data having been input as data to be written onto the magnetic disk, the write data including a redundancy code that is used for data error correction;
in a case where the write data further include a bit string of a second pattern different from the first pattern, reading first user data from the storage unit, inverting one or more bit values of bit string included in the read first user data, and encoding the first user data of which the one or more bit values is inverted to generate the write data, the first user data corresponding to the second pattern and write data before encoded; and
writing write data including inverted bit value onto the magnetic disk.

14. The method of claim 13, wherein the storage unit stores information indicating whether detection of the first pattern or the second pattern is to be notified, and
the method further comprises:
in a case where the write data include the bit string of the first pattern or the bit string of the second pattern, notifying that the first pattern or the second pattern have been detected according to the information stored in the storage unit.

15. The method of claim 13, further comprising:
in a case where the write data include a bit string of Nth pattern different from the first pattern and from the second pattern, inverting one or more bit values of the bit string included in second user data read from the storage unit, and notifying that the Nth pattern has been detected, where N is integer, the second user data corresponding to the Nth pattern and write data before encoded.

16. The method of claim 13, further comprising:

in a case where error detection and correction of read data read from the magnetic disk is failed and a bit string included in the read data is a pattern that is modified based on the first pattern, inverting one or more bit values of the bit string and performing an error correction again on the read data that includes the bit string of which the one or more bit values is inverted.

17. The method of claim 15, further comprising:

in a case where error detection and correction of read data read from the magnetic disk is failed and a bit string included in the read data before or after the error detection and correction is a pattern that is modified based on the Nth pattern, inverting one or more bit values of the bit string and performing an error correction again, or inverting one or more bit values.

* * * * *